United States Patent [19]

Servi

[11] Patent Number: 5,278,904
[45] Date of Patent: Jan. 11, 1994

[54] METHOD OF VERIFYING IDENTIFICATION

[75] Inventor: Leslie D. Servi, Lincoln, Mass.

GTE Laboratories Incorporated, Delaware

[21] Appl. No.: 958,626
[22] Filed: Oct. 9, 1992
[51] Int. Cl.⁵ .............................................. H04K 1/00
[52] U.S. Cl. ........................................ 380/23; 380/25; 340/825.34
[58] Field of Search ...................... 380/21, 23, 24, 25; 340/825.31, 825.34

[56] References Cited

U.S. PATENT DOCUMENTS

| | | | |
|---|---|---|---|
| 4,779,224 | 10/1988 | Moseley et al. | 380/25 X |
| 4,853,962 | 8/1989 | Brockman | 380/25 X |
| 5,130,519 | 7/1992 | Bush et al. | 380/24 X |
| 5,131,038 | 7/1992 | Puhl et al. | 380/23 |
| 5,150,412 | 9/1992 | Maru | 380/23 X |

Primary Examiner—Tod R. Swann
Attorney, Agent, or Firm—Lawrence E. Monks

[57] ABSTRACT

A method for secure exchange of password information between a requester node and a server node using a verification protocol for confirming the identification of the requester node by the server in the presence of eavesdroppers is disclosed. By adjusting the parameters of the protocol the possibility that an intercepter of the exchanges can impersonate a requester node after receiving a specified number of exchanges may be engineered to satisfy security objectives.

3 Claims, 2 Drawing Sheets

METHOD OF VERIFYING IDENTIFICATION

FIELD OF THE INVENTION

The current invention relates generally to a method for remotely verifying an identification code and more particularly to a method for remotely verifying an identification code by querying a password in a manner such that there is a reduced chance of a third party determining the password.

BACKGROUND OF THE INVENTION

In many technologies it is important to verify the identity of a remote device before allowing access to certain protected resources for that device. This verification process generally requires that the device identify itself and subsequently reveal a password to confirm its identity. During the course of revealing the password, it is possible for another to determine the password and use it later to impersonate the originating device. In conventional methods for verifying the identity of a device attempting access to a protected resource, the password is sent in clear form without encryption which allows an intercepter to learn the password immediately which facilitates the possibility of fraudulent access.

Thus it is desirable to perform the identification process in a way that there is a low probability that any query of the password for a device will allow a third party to learn the password. Since the identity of the device must be verified remotely, it is further desirable to assign passwords and perform the identification process efficiently without undue communication between the device and the verifier.

OBJECTS OF THE INVENTION

It is a primary object of the instant invention to obviate the above noted disadvantages of the prior art.

It is a further object of the current invention to provide for a method of reliable identification of a device remotely.

It is a still further object of the current invention to provide for a method of reliable identification of a device remotely by verification of an assigned password.

It is a further object of the invention to provide a method for reliable identification of a device attempting access to protected resources by a remote verifier using reduced communications.

It is a yet further object of the invention to provide a method for reliable identification of a device attempting access to protected resources by a remote verifier using reduced memory.

SUMMARY OF THE INVENTION

The above and other objects and advantages are achieved in one aspect of this invention by a method for verifying the claimed identity of a requester node which requests access to a protected resource of a server node. Upon verification by the server node access to the protected resource is granted. In addition to the requester node's identification, a password which is known to the server node is stored in the requester and is utilized during the verification process. Upon receiving a request for access to a protected resource from a requester node claiming a particular identity, the server node sends a mask consisting of binary digits in a random order. The requester node is expected to respond to this mask with a reply that is consistent with both the password of the device and the mask. Specifically, the bits of both the password and the mask are "ANDed" and the result transmitted to the server node as the reply. The server node denies the call request upon failure to respond properly.

In another aspect of the invention, the server node sends the mask to the device as addresses. Each address specifies the position of a binary "one" in the mask.

In yet another aspect of the invention, exemplary values for the length of the password and the mask are disclosed so as minimize either transmission time or the storage requirements in the requester node. Other values can be determined to satisfy other network strategies and objectives.

BRIEF DESCRIPTION OF THE DRAWINGS

For a better understanding of the present invention, together with other objects, advantages and capabilities thereof, reference is made to the following Description and appended Claims, together with the Drawings, in which:

TABLE 1 depicts the range of parameters M and N, and the associated transmission requirements such that the probability that an eavesdropper successfully impersonates a legitimate wireless device after 50 eavesdropping would be no greater than 0.0001.

DETAILED DESCRIPTION OF THE INVENTION

Figure 1:
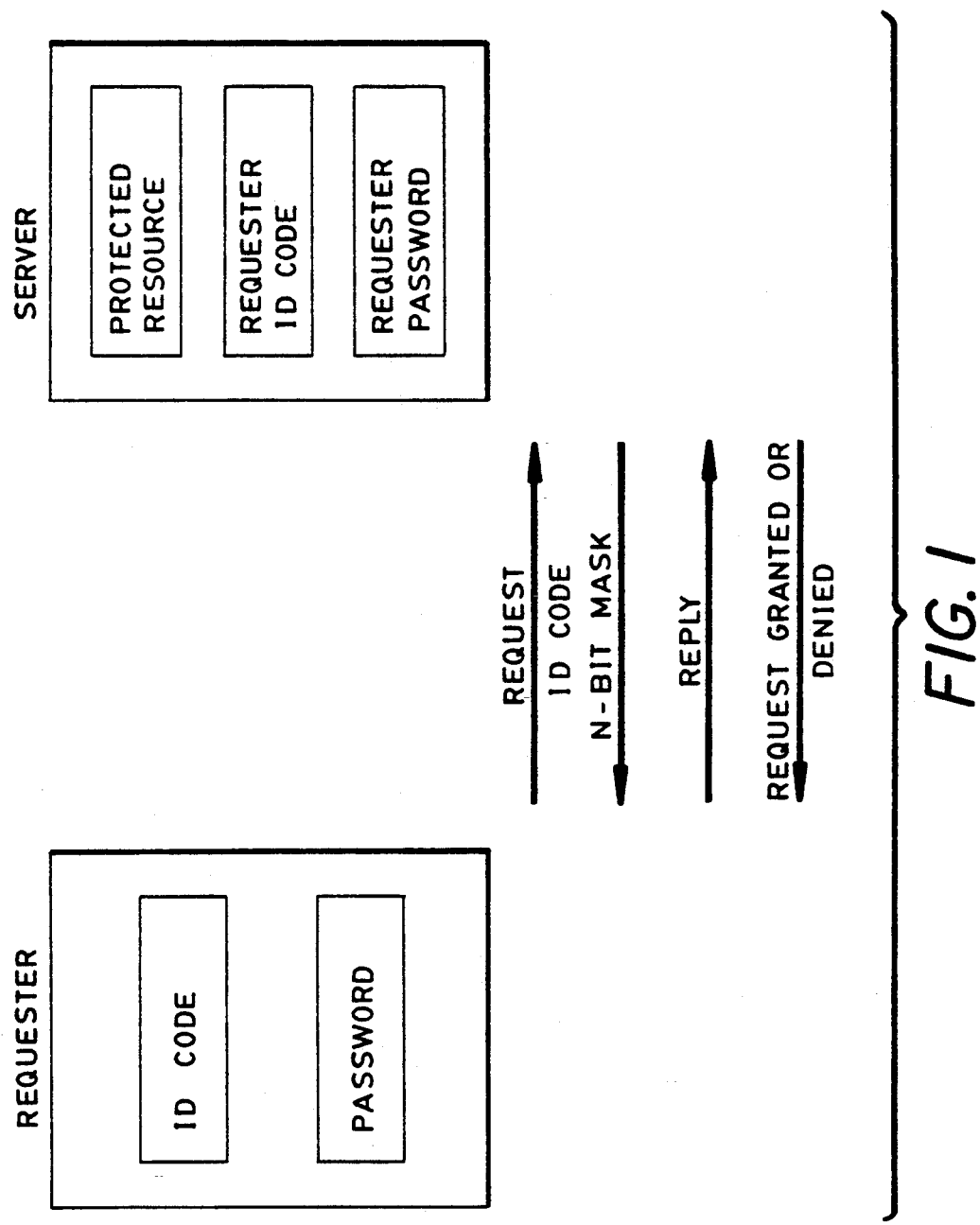
FIG. 1 is a flow-diagram of the interaction between a requester node desiring access to a protected resource at a remote server node in accordance with the current invention.

In FIG. 1 there is shown a flow-diagram of the interaction between a requester node desiring access to a protected resource at a remote server node in accordance with the current invention. The requester and server nodes may be embodied as a general purpose computer systems providing logon or access identification through password verification, a communication system such as a wireless telephone requesting connection to the telephone network, or any system of devices requiring access security for resources under the system's control.

In one embodiment of the invention, the requester node is assigned a randomly selected password consisting of N binary bits that is delivered to the node and stored therein. If the password is sent electronically, the transmission must maintain a high level of protection from interception and deciphering. One of ordinary skill in the art will recognize that other methods of delivering and storing the password include transferring a PROM (Programmable Read Only Memory) or providing for a fixed ROM (Read Only Memory) within the the requester node. Since the password assignment is done only once, slower-secure methods of sending the password are feasible.

The requester node initiates the exchange with the server node by communicating its unique identification code and requesting access to a protected resource of the server. Upon receiving the request, the server node responsible for the security of the protected resource attempts to verify the identity of the requester. The server node randomly selects a binary number consisting of N bits and having exactly M ones and N-M zeros. The values of the parameters N and M are chosen to meet performance objectives for security that will be described later. The selected N-bit number denoted a mask is communicated to the requester node wherein it is stored for further processing. The requester node calculates a response to the delivered mask whereby if the ith bit of the transmitted N-bit number or mask is 0 then the corresponding ith bit of the response is zero and if the ith bit of the mask is 1 then the ith bit of the response is set to the ith bit of the password. The response is communicated to the server node wherein the server node verifies the authenticity of the response by determining whether the claimed identity is consistent with the response, mask, and the password stored in the requester node of the claimed identity and known only by the requester and server nodes. It is clear that all communication is conducted in a error-free transmission medium using perhaps conventional error-correcting codes so as not to misrepresent either the mask or response.

In one embodiment of the invention, the mask is communicated by the server node as M binary numbers, $p(i), i=1, \ldots, M$, where $p(i)$ is the ith position containing a one. In this embodiment $M \log_2 N$ bits are required to be communicated as the mask, which under certain values of N and M is less than the N bits of the embodiment described above. In another embodiment of the invention a further reduction of the number of bits required to be communicated is possible if the mask is selected such that $0 \leq p(i+1) - p(i) < (N/M)$. Accordingly, it is sufficient to transfer the M binary numbers $p(i+1) - p(i)$ for $i=2, \ldots, M$ and $p(1)$. Thus, the position of the first one bit or $p(1)$ is communicated and the difference from the preceding one bit to the next one bit in the mask is sent as $p(i)$. This embodiment utilizes $M \log_2(M/N)$ bits.

In a yet further embodiment of the invention the requester node replies with the address of the position of each bit of the password having a binary value of one in response to the mask.

One intercepting the exchanges of the requester and server nodes learns only the values of the password in the $p(i)$ positions for $i=1, 2 \ldots, M$. This knowledge is of minimal value in attempting to impersonate the identity of the requester node.

As was stated previously, the values of N and M may be chosen to satisfy security objectives for access to the protected resource of the server node. In considering appropriate values for the variables N and M consistent with the security objective as to the likelihood, $\pi$, that an impersonator will be successful in correctly responding to a mask after K eavesdroppings, the following analysis is considered.

If $L_K$ is the average number of positions of the password that are known by one after eavesdropping on K password exchanges between the requester and server nodes.

$$L_K = M + (1 - (M/N))L_{K-1} \text{ and } L_1 = M. \quad (1)$$

This relationship expresses that after each additional eavesdropped interaction, the interceptor knows about the password what he knew before, $L_{K-1}$, plus the M digits that were just learned minus the expected number of bits he just learned but already knew, $(M/N)L_{K-1}$. $L_K$ is thus uniquely:

$$L_K = N(1 - [1 - (M/N)]^K). \quad (2)$$

If having learned of K password exchanges, one attempts to impersonate the requester node, a mask is sent by the server node that consists of M randomly selected positions containing the value binary one. Of these positions, on average, $(M/N)L_K$ positions of the password of the legitimate requester node are known to the imposter and $M'(M/N)L_K$ positions are not known. The average number of unknown positions is calculated as:

$$\begin{aligned}
F(N,M,K) &= M - (M/N)L_K \\
&= M(M/N)\{N(1 - [1 - (M/N)]^K)\} \\
&= M - (1(M/N))^K.
\end{aligned} \quad (3)$$

Through proper choice of these parameters different security objectives and strategies can be satisfied.

If the security objective is to maximize the number of unknown bits of the password to an impersonator, the value of M that will maximize $F(N,M,K)$ is $$M = N/(K+1). \quad (4)$$

It is understood that M must be an integer and thus the value determined is rounded if necessary. Combining these expressions, $F(N,(N/(K+1),K) = (N/K+1)^K$ which for $K \geq 20$ is very accurately approximated by $0.37 N/(K+1)$. The chance of an imposter correctly determining the $F(N,M,K)$ unknown bits is approximately $0.5^{**}F(N,M,K)$ or stated in words 0.5 raised to the $F(N,M,K)$ exponent. If the chance of an imposter correctly determining the unknown bits is desired to be $\pi$, then $F(N,(N/(K+1),K)$ is determined to be $-\log_2(\pi)$. Accordingly, N is calculated to be approximately $-\log_2(\pi) (K+1)/0.37$ and consequently M is approximately $-\log_2(\pi)/0.37$ which is independent of K as long as $K \geq 20$.

If an alternative security objective is to reduce N, thus limiting the amount of memory required by the requester node, M should be chosen as approximately $-\text{Log}_2(\pi)/0.4$ and N is consequently chosen as $-2.5 K \text{Log}_2(\pi)$ for a given percentage $\pi$ of success in responding with the correct reply after K password exchanges.

If yet another security objective is to reduce the time for communication of the verification procedure, this amounts to reducing the value $M \text{Log}_2(N)$. The value for M should be chosen as approximately $\text{Int}[1 - \text{Log}_2(\pi)]$ and n is calculated as $M/(1 + (\text{Log}_2(\pi)/M)^{**}(1/K))$ for a given percentage $\pi$ of success in responding with the correct reply after K interceptions.

Figure 2:
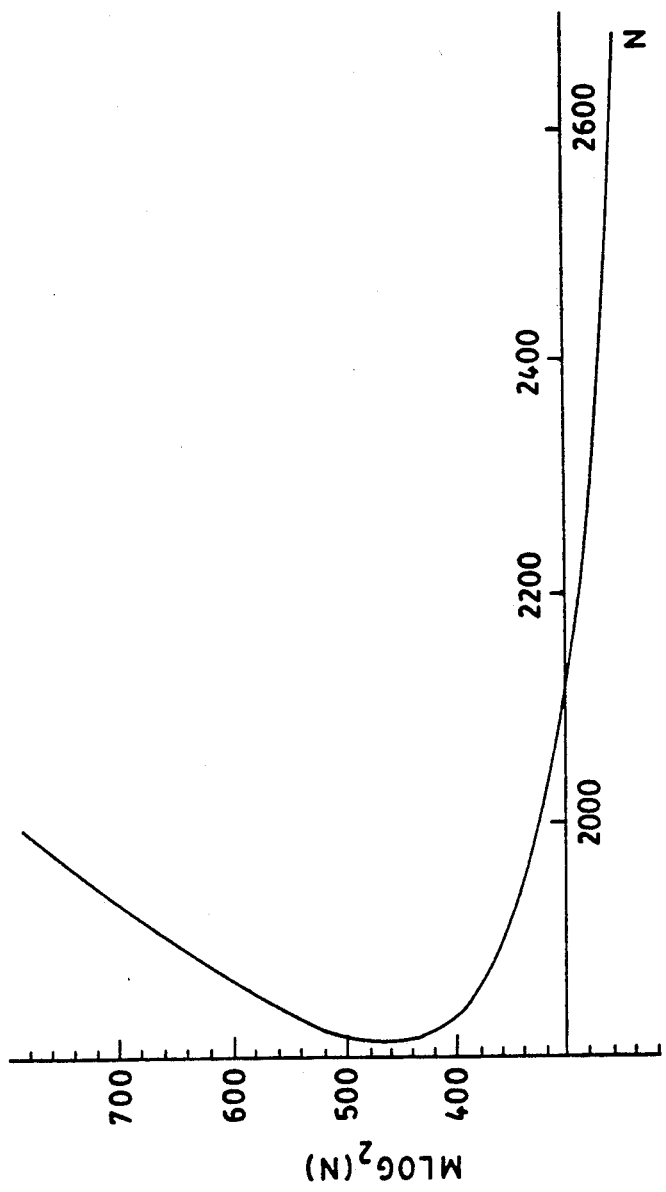
FIG. 2 is a graph of the trade-off between memory requirements for the wireless device and transmission requirements for a successful impersonation of a legitimate wireless device with probability no greater than 0.0001 after up to 50 eavesdroppings.

FIG. 2 is a graph of the trade-off between memory requirements imposed upon the requester node and the communication requirements for performing the verification procedure for values of K up to 50 and p no greater than 0.0001.

EXAMPLES

The following Examples and Table are presented to enable those skilled in the art to more clearly understand and practice the present invention. These Examples should not be considered as a limitation upon the scope of the present invention, but merely as being illustrative and representative thereof.

TABLE 1 provides an exact calculation in accordance with the invention of the range of parameters M and N, and the associated transmission requirements such that the probability that an eavesdropper successfully impersonates a legitimate requester node after 50 eavesdropping would be no greater than 0.0001.

While there has been shown and described what are at present considered the preferred embodiments of the invention, it will be obvious to those skilled in the art that various changes and modifications can be made therein without departing from the scope of the invention as defined by the appended Claims.

TABLE 1

Computation of memory requirements, n, and transmission requirements, m (n) Log$_2$ (n) as a function of m for k = 50 and p = 10$^{-4}$.

| m | n | m Log$_2$(n) |
|---|---|---|
| 14 | 13654 | 196 |
| 15 | 6243 | 195 |
| 16 | 4336 | 208 |
| 17 | 3472 | 204 |
| 18 | 2983 | 216 |
| 19 | 2673 | 228 |
| 20 | 2461 | 240 |
| 21 | 2309 | 252 |
| 22 | 2197 | 264 |
| 23 | 2111 | 276 |
| 24 | 2045 | 264 |
| 25 | 1993 | 275 |
| 26 | 1952 | 286 |
| 27 | 1920 | 297 |
| 28 | 1895 | 308 |
| 29 | 1875 | 319 |
| 30 | 1859 | 330 |
| 31 | 1847 | 341 |
| 32 | 1838 | 352 |
| 33 | 1832 | 363 |
| 34 | 1828 | 374 |
| 35 | 1826 | 385 |
| 36 | 1826 | 396 |
| 37 | 1827 | 407 |
| 38 | 1829 | 418 |
| 39 | 1832 | 429 |
| 40 | 1836 | 440 |
| 41 | 1841 | 451 |
| 42 | 1847 | 462 |
| 43 | 1854 | 473 |
| 44 | 1861 | 484 |
| 45 | 1869 | 495 |
| 46 | 1877 | 506 |
| 47 | 1885 | 517 |
| 48 | 1894 | 528 |
| 49 | 1903 | 539 |
| 50 | 1913 | 550 |

What is claimed is:

1. A method of verifying the claimed identity of a requester node by a server node comprising the steps of:
   (a) storing an identification code at the requester node;
   (b) receiving a password at the requester node;
   (c) storing said password at the requester node;
   (d) communicating a request to access a protected resource at the server node by the requester node;
   (e) generating a mask at the server node;
   (f) Boolean "anding" said mask and password of the requester node at the server node;
   (g) receiving said mask at the requester node from the server node;
   (h) Boolean "anding" said mask and said password at the requester node;
   (i) communicating the result of step (h) to the server node;
   (j) granting access to the protected resource by the server node if the result of step (f) and Step (h) are equal.

2. A method of verifying the claimed identity of a requester node by a server node comprising the steps of:
   (a) storing an identification code at the requester node;
   (b) receiving a password at the requester node;
   (c) storing said password at the requester node;
   (d) communicating a request to access a protected resource at the server node by the requester node;
   (e) generating a mask at the server node representing addresses specifying the position of a binary one;
   (f) Boolean "anding" said mask and password of the requester node at the server node;
   (g) receiving said mask at the requester node from the server node;
   (h) Boolean "anding" said mask and said password at the requester node;
   (i) communicating the result of step (h) to the server node;
   (j) granting access to the protected resource by the server node if the result of step (f) and Step (h) are equal.

3. A method of verifying the claimed identity of a requester node by a server node comprising the steps of:
   (a) storing an identification code at the requester node;
   (b) receiving a password at the requester node;
   (c) storing said password at the requester node;
   (d) communicating a request to access a protected resource at the server node by the requester node;
   (e) generating a mask at the server node representing the position of the first binary one in the mask and a differential increment of the next value of binary one in the mask;
   (f) Boolean "anding" said mask and password of the requester node at the server node;
   (g) receiving said mask at the requester node from the server node;
   (h) Boolean "anding" said mask and said password at the requester node;
   (i) communicating the result of step (h) to the server node;
   (j) granting access to the protected resource by the server node if the result of step (f) and Step (h) are equal.

* * * * *